(12) United States Patent
Iarochenko (10) Patent No.: US 10,084,206 B2
(45) Date of Patent: Sep. 25, 2018

(54) FAST CHARGE APPARATUS FOR A BATTERY

(71) Applicant: Alexandre M. Iarochenko, Orillia (CA)

(72) Inventor: Alexandre M. Iarochenko, Orillia (CA)

( * ) Notice: Subject to any disclaimer, the term of this patent is extended or adjusted under 35 U.S.C. 154(b) by 688 days.

(21) Appl. No.: 14/607,530

(22) Filed: Jan. 28, 2015

(65) Prior Publication Data

US 2015/0147661 A1 May 28, 2015

Related U.S. Application Data (63) Continuation-in-part of application No. 14/539,448, filed on Nov. 12, 2014, now abandoned.
(Continued)

(51) Int. Cl.
*H01M 10/0569* (2010.01)
*H01M 4/36* (2006.01)
(Continued)

(52) U.S. Cl.
CPC ..... *H01M 10/0569* (2013.01); *H01M 2/1626* (2013.01); *H01M 2/26* (2013.01);
(Continued)

(58) Field of Classification Search
CPC ........... H01M 10/054; H01M 10/0568; H01M 10/0569; H01M 10/0585; H01M 10/44;
(Continued)

(56) References Cited

U.S. PATENT DOCUMENTS

| 4,707,423 A | 11/1987 | Kalnin et al. |
| 6,117,585 A | 9/2000 | Anant et al. |

(Continued)

FOREIGN PATENT DOCUMENTS

| CN | 103682495 A | 3/2014 |
| EP | 2631982 A1 | 8/2013 |
| WO | 2016/074070 A1 | 5/2016 |

OTHER PUBLICATIONS

Ka, B. H. and S. M. Oh, "Electrochemical Activation of Expanded Graphite Electrode for Electrochemical Capacitor", Journal of the Electrochemical Society, vol. 155, pp. A685-A692, published Jul. 25, 2008.*

(Continued)

*Primary Examiner* — Sarah A. Slifka
*Assistant Examiner* — Lilia Nedialkova
(74) *Attorney, Agent, or Firm* — Dickinson Wright PLLC (57) ABSTRACT

A fast charge system 20 including a fast charge composite 60 and a secondary battery 22 enables the secondary battery 22 to be charged in less time than is possible with traditional charging means. The fast charge composite 60 includes a separator 62 of cellulose wetted with a second electrolyte 64 that contains third ions 94 having a positive charge and fourth ions 96 having a negative charge and contacting the adjacent electrode 32, 46 of the secondary battery 22. A fast charge layer 30 of thermally expanded graphite is disposed adjacent and parallel to the separator 62. A second electrical power $P_{FC}$, which may be greater than a maximum charging power $P_{MAX}$ transferred through traditional charging, is transferred as a function of a second voltage $V_2$ applied between the fast charge layer 30 and the battery lead 34, 50 of the adjacent electrode 32, 46, which causes the third ions 94 and the fourth ions 96 to migrate through the separator 62 to cause the secondary battery 22 to become charged.

14 Claims, 4 Drawing Sheets

Related U.S. Application Data (60) Provisional application No. 61/903,145, filed on Nov. 12, 2013.

(51) Int. Cl.

| | | |
|---|---|---|
| *H01M 4/583* | (2010.01) | |
| *H01M 2/16* | (2006.01) | |
| *H01M 2/26* | (2006.01) | |
| *H01M 4/133* | (2010.01) | |
| *H01M 4/134* | (2010.01) | |
| *H01M 4/1395* | (2010.01) | |
| *H01M 4/38* | (2006.01) | |
| *H01M 4/46* | (2006.01) | |
| *H01M 4/62* | (2006.01) | |
| *H01M 10/054* | (2010.01) | |
| *H01M 10/0568* | (2010.01) | |
| *H01M 10/0585* | (2010.01) | |
| *H01M 10/44* | (2006.01) | |
| *H01M 4/60* | (2006.01) | |
| *H01M 12/00* | (2006.01) | |

(52) U.S. Cl.
CPC ............ *H01M 4/133* (2013.01); *H01M 4/134* (2013.01); *H01M 4/1395* (2013.01); *H01M 4/38* (2013.01); *H01M 4/463* (2013.01); *H01M 4/583* (2013.01); *H01M 4/625* (2013.01); *H01M 10/054* (2013.01); *H01M 10/0568* (2013.01); *H01M 10/0585* (2013.01); *H01M 10/44* (2013.01); *H01M 4/606* (2013.01); *H01M 12/005* (2013.01); *H01M 2300/0028* (2013.01); *Y10T 29/49115* (2015.01)

(58) Field of Classification Search
CPC ....... H01M 12/005; H01M 2300/0028; H01M 2/1626; H01M 2/26; H01M 4/133; H01M 4/134; H01M 4/1395; H01M 4/38; H01M 4/463; H01M 4/583; H01M 4/606; H01M 4/625; Y10T 29/49115

See application file for complete search history.

(56) References Cited

U.S. PATENT DOCUMENTS

| | | |
|---|---|---|
| 7,489,107 B2 | 2/2009 | Hartley et al. |
| 7,659,014 B2 | 2/2010 | Sohn |
| 8,119,269 B2 | 2/2012 | Ramasubramanian et al. |
| 8,152,865 B2 | 4/2012 | Ando et al. |
| 8,193,777 B2 | 6/2012 | Nakashima |
| 8,288,032 B2 | 10/2012 | Mttsuda et al. |
| 8,574,736 B2 | 11/2013 | Lee et al. |
| 2009/0029257 A1* | 1/2009 | Ando .................. H01G 9/016 429/231.95 |
| 2009/0142668 A1 | 6/2009 | Ishii |
| 2009/0148759 A1* | 6/2009 | Mitsuda ................ H01G 9/058 429/142 |
| 2012/0058380 A1 | 3/2012 | Wang et al. |
| 2012/0082905 A1 | 4/2012 | Brown |
| 2012/0105007 A1 | 5/2012 | Amiruddin et al. |
| 2012/0293913 A1 | 11/2012 | Kim et al. |
| 2012/0299555 A1 | 11/2012 | Tam et al. |
| 2012/0301778 A1 | 11/2012 | Trevey et al. |
| 2012/0315535 A1* | 12/2012 | Matsumoto ....... H01M 10/0567 429/188 |
| 2013/0252111 A1 | 9/2013 | Takahata et al. |
| 2013/0285597 A1 | 10/2013 | Goldstein |
| 2014/0004402 A1 | 1/2014 | Yan et al. |
| 2014/0253023 A1 | 9/2014 | Paryani et al. |
| 2015/0147661 A1 | 5/2015 | Iarochenko |

OTHER PUBLICATIONS

Supplementary European Search Report; Application No. EP 15 85 8433; dated Mar. 12, 2018.
Extended European Search Report for Application No./Patent No. 15858923.1-1108 / 3218956 claiming priority to PCT/CA2015000574 dated May 17, 2018.

* cited by examiner

FAST CHARGE APPARATUS FOR A BATTERY

CROSS REFERENCE TO RELATED APPLICATION

This application is a continuation-in-part of U.S. patent application Ser. No. 14/539,448 filed Nov. 12, 2014, which claims the benefit of provisional application Ser. No. 61/903,145 filed Nov. 12, 2013.

BACKGROUND OF THE INVENTION

1. Field of the Invention

This invention relates to a fast charge composite combined with a secondary battery for charging the secondary battery.

2. Description of the Prior Art

It is generally known to construct batteries as a stack of layers, with a cathode sandwiched with the membrane and disposed in spaced and parallel relationship with the anode and an electrolyte impregnating the membrane to carry an ion migration through the membrane. An example of such a battery is shown in U.S. Patent Application 2009/0142668.

It is also known to construct a battery as a stack of layers that form a plurality of electrochemical cells which are connected in parallel or in series. An example of such a battery construction is shown in U.S. Patent Application No. 2012/0058380.

Secondary battery cells that use an electrolyte to convey first ions having a positive charge and second ions having a negative charge between anode and cathode electrodes are well known. An example of such a battery is shown in U.S. Pat. No. 4,707,423.

Secondary battery cells are typically charged using a traditional charging means of applying a first voltage between the anode and the cathode to cause a first current to flow therebetween. An example of such charging is described in U.S. Pat. No. 7,489,107.

It is also well know that a secondary battery may only be recharged with a maximum charging power that is a function of the first voltage between the anode and the cathode times the first current therebetween and applied over a first time interval. There are two main types of damage to battery cells that result from application of power greater than the maximum charging power and cause a substantial loss in capacity. The first main type of damage results from overheating, which causes damage the battery cell through melting and/or the production of gasses (e.g. through boiling the electrolyte). Eventually, overheating damage can cause a short circuit between the electrodes. The second main type of damage is plating, also known as deposition, which occurs with intercalation electrodes that accept ions within a crystalline lattice structure. During normal operation, ions are chemically inserted into the intercalation electrode, where they react with the electrode, trapping the metallic products of the reaction inside of the lattice structure. However, when a power greater than the maximum charging power is applied, ions will react on the surface of an intercalation electrode and cause a metallic layer to form or to be plated on that surface. The formation of that metallic layer is uneven and can create needle-like dendrite structures that extend into the membrane, which can eventually short-circuit the battery cell.

U.S. Pat. No. 6,117,585 to Anani et al. discloses a hybrid energy storage device constructed as a stack of layers, with two electrode layers and a first electrolyte forming a battery. A second electrolyte, sandwiched between a third electrode and one of the battery electrodes, forms an electrolytic capacitor. The Anani et al. '585 device requires an external conductor to directly connect the non-adjacent battery electrode to the capacitor electrode.

SUMMARY OF THE INVENTION

The invention provides for a fast charge composite with a second electrolyte that includes third ions having a positive charge and fourth ions having a negative charge. The fast charge composite is disposed adjacent to and contacting one of the electrodes of a secondary battery, which is the adjacent electrode, and the remaining electrode of the secondary battery is the remote electrode, which is electrically isolated from the fast charge composite. The fast charge composite is responsive to application of a second electrical power, which is greater than the maximum charging power that can be applied to the secondary battery using the traditional charging means of applying a first voltage between the electrodes of the secondary battery to induce a first current therebetween. The second electrical power is a function of a second voltage between the fast charge composite and the adjacent electrode multiplied by the second current therebetween and applied over a second time interval. The application of the second electrical power causes the third ions and the fourth ions to migrate between the adjacent electrode and the fast charge composite to change the electrochemical potential of the adjacent electrode, which enables the secondary battery to store the predetermined amount of electrical energy in a second time interval that is shorter than the first time interval that it would take using the traditional charging means at or below the maximum charging power. In other words, the battery can be charged to its capacity in a shorter time using the fast charge composite than is possible using traditional charging means.

The invention also provides for a method of constructing such a fast charge composite with a second electrolyte, including: dissolving $AlCl_3$ in ethanol to create a background solution, combining the background solution with glycerol to make a second electrolyte including third ions having a positive charge and fourth ions having a negative charge, and wetting a separator of electrically insulating material with the second electrolyte.

Advantages of the Invention

The invention in its broadest aspect provides a fast charge composite that allows a secondary battery to store a predetermined amount of electrical energy in less time than is possible using the traditional charging means of applying a first voltage and a first current between the battery leads.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a fast charge system 20 including a secondary battery 22 with a capacity to store a predetermined amount of electrical energy is disclosed. The term "secondary battery" refers to an electrochemical energy storage device that is capable of being recharged.

As shown in the figures, the secondary battery 22 includes a pair of electrodes 32, 46 including an anode layer 32 and a cathode layer 46 extending in parallel and spaced relationship to one another.

The anode layer 32 consists of 99.4 to 99.9 wt % of solid Aluminum of 99.95% purity and 0.1 to 0.6 wt % of Indium with first rectangular borders to define a first length of 1.2 cm, a first width of 1.7 cm, and a first thickness of 0.1 mm. A negative battery lead 34 of electrically conductive material is in electrical contact with the anode layer 32 for conducting electrical current with external circuitry for charging or discharging the secondary battery 22. The negative battery lead 34 could also serve as a point of connection to another battery cell as part of a multi-cell battery device. The negative battery lead 34 could be a wire, pad, terminal, or any other suitable means of making an electrical connection.

The anode layer 32 is attached in electrical contact with the negative battery lead 34 using an electrically conductive cement 36 that includes particles containing metal. Examples of such cements 36 are Two Part conductive Silver Paint (Part No. 12642-14), sold by Electron Microscopy Sciences and Solder-It Aluminum Solder Passe, sold by SOLDER-IT, INC. of Pleasantville, N.Y.

The cathode layer 46 has a second rectangular border with a second length of 1.4 cm, a second width of 1.9 cm, and a second thickness of 0.1 mm. The cathode layer 46 includes a carrier sheet 48 of cellulose and an electroactive layer 28 integrated within and disposed upon the carrier sheet 48 on the side facing the anode layer 32. In other words, the electroactive layer 28 coats the surface and extends into the structure of the carrier sheet 48. The electroactive layer 28 of the cathode layer 46 contains a host lattice 54 that defines a plurality of voids and includes a conjugated system with delocalized r electrons. A conjugated system is defined as a system of connected p-orbitals containing delocalized electrons in chemical compounds. More specifically, the conjugation is the overlapping of one p-orbital with another across adjacent single (sigma) bonds. One such compound that has such a conjugated system is graphite. Other compounds such as, but not limited to, polyaniline and polyconjugated linear hydrocarbon polymers also include conjugated systems with overlapping p-orbitals.

A positive battery lead 50 containing thermally expanded graphite is electrically connected to the electroactive layer 28 of the cathode layer 46 for conducting electrical current with external circuitry for charging and/or discharging the secondary battery 22. An adhesive 52 containing graphite attaches the electroactive layer 28 to the positive battery lead 50 and conducts electrical current therebetween. One such positive battery lead 50 comprises thermally expanded graphite foil 66. An alternative positive battery lead 50 comprises a rod of graphite with a diameter of 0.1 mm. The positive battery lead 50 could also serve as a point of connection to another battery cell as part of a multi-cell battery device. The positive battery lead 50 could include a wire, pad, terminal, or any other suitable means of making an electrical connection. However, conductors of metal should not be placed in direct contact with the host lattice 54 of the cathode layer 46 because the metal can migrate into the host lattice 54 and interfere with the functionality of the cathode layer 46 in charging and discharging the secondary battery 22.

A dopant 58 containing Aluminum Alcoholate and Aluminum Glycerate is bonded to the conjugated system of the host lattice 54 to alter the electrochemical properties of the electroactive layer 28 of the cathode layer 46 to increase the rate of the reactions with the first ions 24 and the second ions 26 for charging and discharging the secondary battery 22. The dopant 58 is also intercalated in the host lattice 54 so that particles of the dopant 58 are embedded in the voids of the host lattice 54.

A membrane 38 of cellulose having a third thickness of 0.08 mm and defining a plurality of pores is sandwiched between the anode layer 32 and the cathode layer 46 for providing electrical insulation and defining a first voltage $V_1$ therebetween. The membrane 38 is an electrical insulator, but is permeable to dissolved ions.

The membrane 3 is wetted with a first electrolyte 44 so the first electrolyte 44 impregnates the pores of the membrane 38, The first electrolyte 44 includes first ions 24 that contain Aluminum and have a positive charge. The first electrolyte 44 also includes second ions 26 that contain Aluminum and have a negative charge. The first electrolyte 44 is damaged by application of a first voltage $V_1$ greater than a predetermined maximum voltage $V_{MAX}$.

An excess ion migration is carried by the first electrolyte 44 through the membrane 38 in response to the application of a first current $I_1$ between the positive battery lead 50 and the negative battery lead 34 that is greater than a predetermined maximum current $I_{MAX}$.

A maximum charging power $P_{MAX}$ is defined as the first voltage $V_1$ times the first current $I_1$, with either the first voltage $V_1$ being greater than the predetermined maximum voltage $V_{MAX}$ or the first current $I_1$ being greater than the predetermined maximum current $I_{MAX}$.

Figure 1:
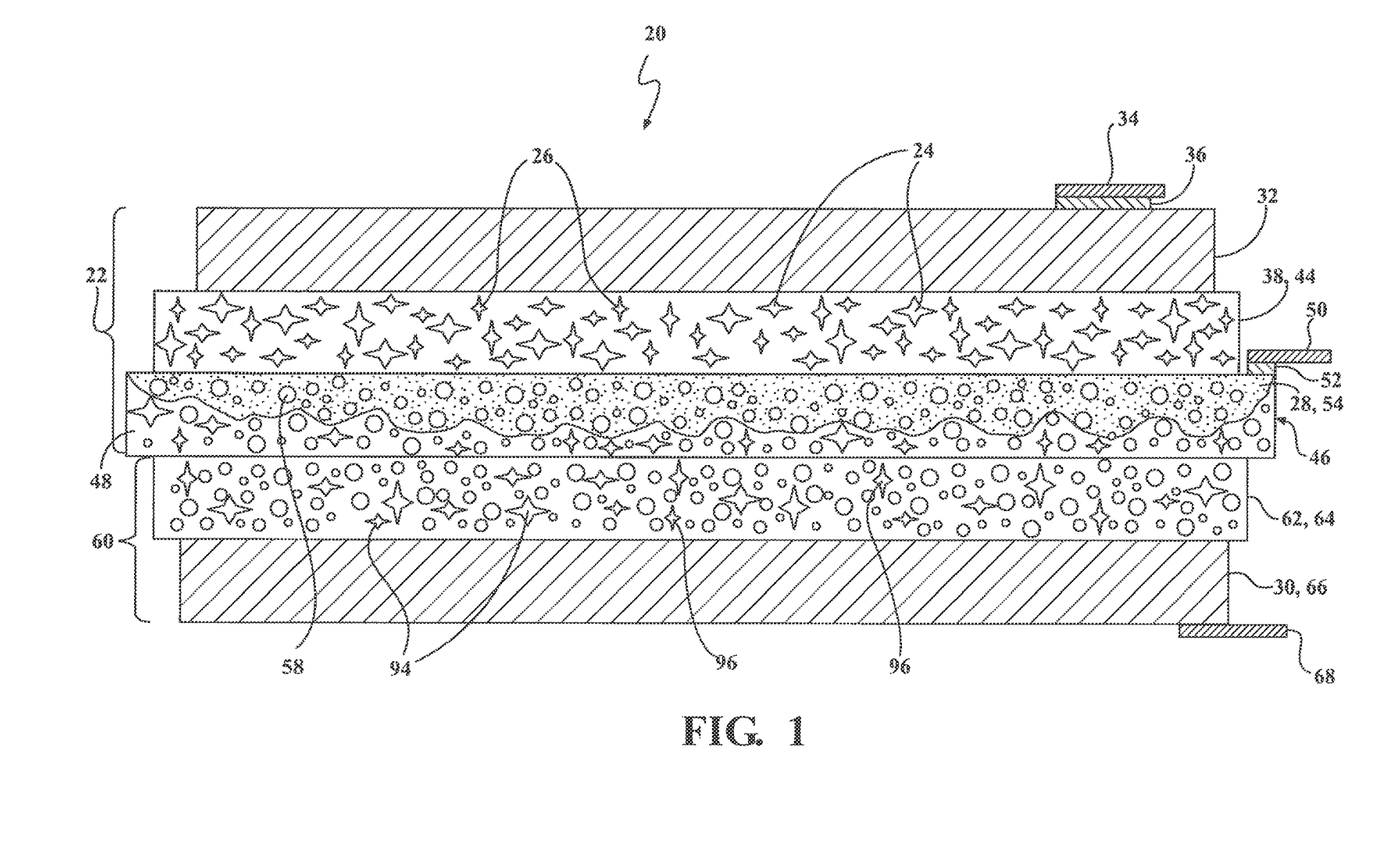
FIG. 1 is a schematic cut-away view of a secondary battery with a fast charge composite disposed adjacent a cathode layer of a secondary battery.
Figure 2:
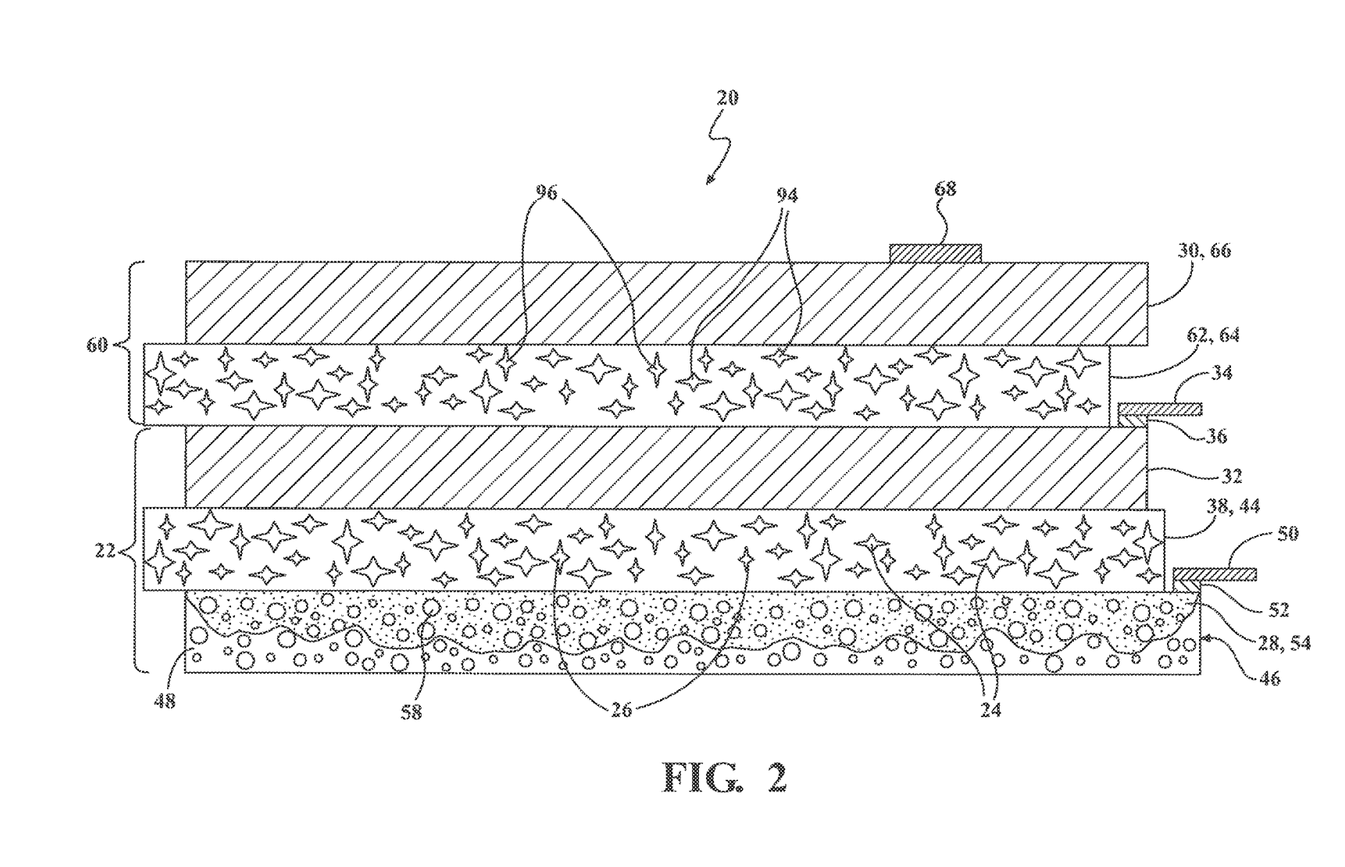
FIG. 2 is a schematic cut-away view of a secondary battery with a fast charge composite disposed adjacent an anode layer of a secondary battery.
Figure 3:
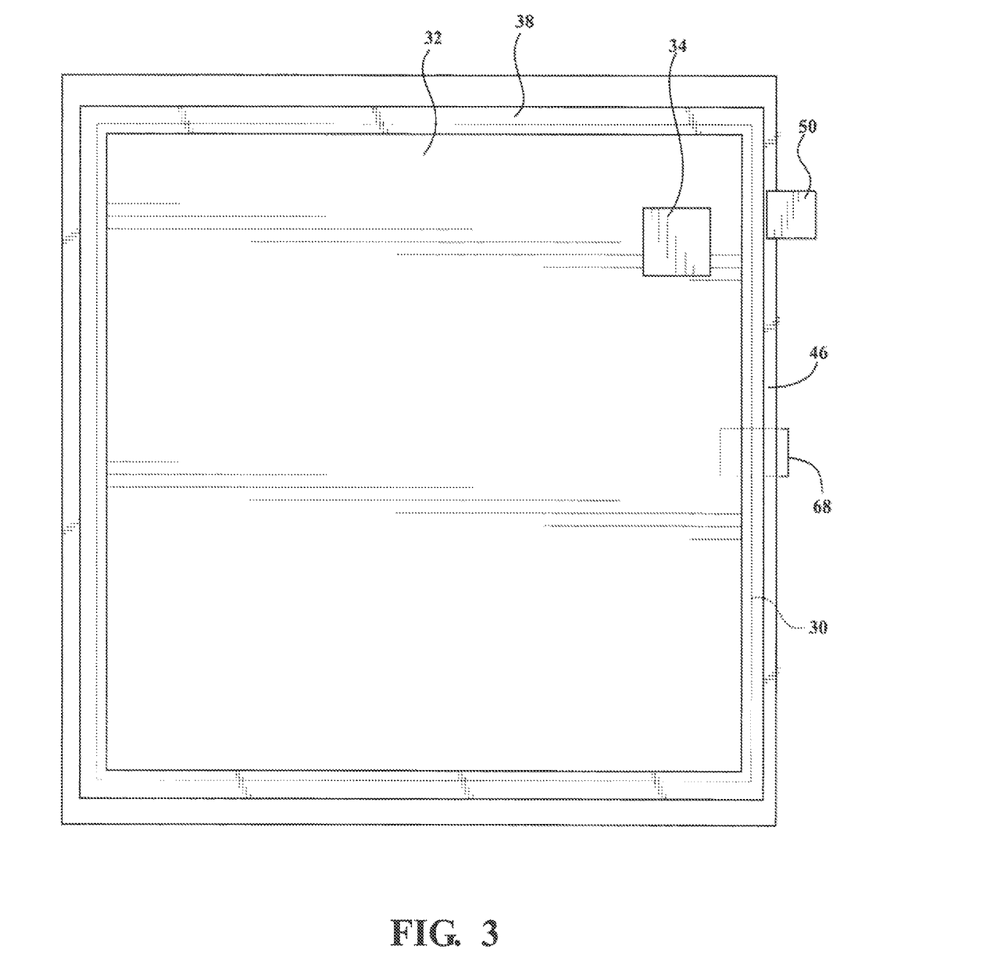
FIG. 3 is a cut-away top view of a secondary battery with a fast charge composite disposed below and adjacent a cathode layer of a secondary battery.
Figure 4:
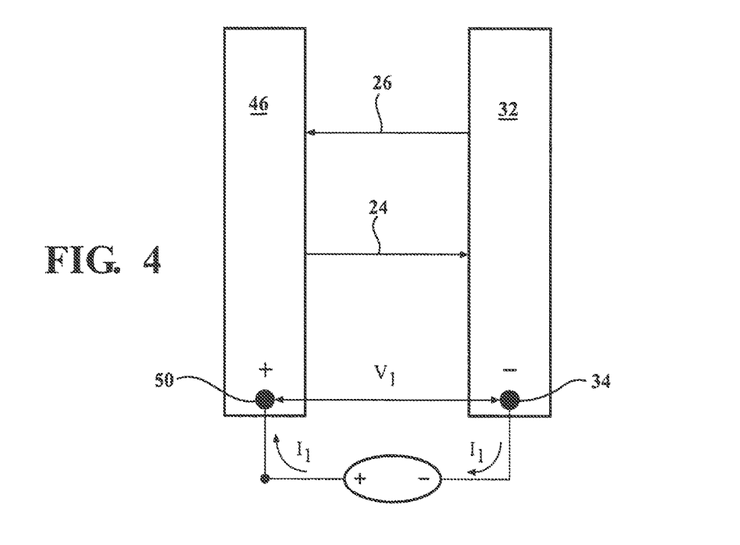
FIG. 4 is a schematic of secondary battery being charged through traditional means and showing the movement of ions and conventional (positive) current flow.

A secondary battery may be charged with a power less than the maximum charging power $P_{MAX}$ and applied over a first time interval $T_1$ as is the case with the traditional means of charging a secondary battery 22, shown schematically in FIG. 4. Application of power in excess of the maximum charging power $P_{MAX}$, between the between the positive battery lead 50 and the negative battery lead 34 can cause irreversible damage to the first electrolyte 44 and/or the membrane 38 and/or either of the electrodes 32, 46, which substantially reduces the capacity of the secondary battery 22.

The first electrolyte 44 consists essentially of glycerol and first ions 24 containing Aluminum and having a positive charge, and second ions 26 containing Aluminum and having a negative charge. The first ions 24 include $[Al(ClO_4)_2 \cdot \{C_3H_5(OH)_3\}_2]^+$, and the second ions 26 include $[Al(ClO_4)_4]^-$. The first ions 24 and the second ions 26 migrate between and react with the anode layer 32 and the cathode layer 46 to charge and discharge the secondary battery 22.

A fast charge composite 60 overlies and contacts one of the electrodes 32, 46 of the secondary battery 22. The fast charge composite 60 has a third rectangular border with a third length and a third width that are between those of the first rectangular border of the anode layer 32 and the second rectangular border of the cathode layer 46.

The fast charge composite 60 includes a separator 62 of cellulose that is impregnated with a second electrolyte 64 that includes third ions 94 containing Aluminum and having a positive charge. The second electrolyte 64 also includes fourth ions 96 containing Aluminum and having a negative charge. The separator 62 is disposed parallel to and contacting one of the electrodes 32, 46, which is designated as the adjacent electrode 32, 46. The other one of the electrodes 32, 46 that is not in contact with the separator 62 is designated as the remote electrode 32, 46 and is electrically isolated from the fast charge layer 30. The separator 62 is an electrical insulator, but is permeable to dissolved ions.

The fast charge composite 60 also includes a fast charge layer 30 comprising foil 66 of thermally expanded graphite which is disposed adjacent and parallel to the separator 62 so that the separator 62 is sandwiched between the adjacent electrode 32, 46 and the fast charge layer 30. A fast charge lead 68 of electrically conductive material is electrically connected to the fast charge layer 30 for the application of second electrical power $P_{FC}$, which is greater than the maximum charging power $P_{MAX}$ which can be applied between the battery leads 34, 50.

The second electrical power $P_{FC}$ is a function of a second voltage $V_2$ between the fast charge lead 68 and the battery lead 34, 50 of the adjacent electrode 32, 46 times a second current $I_2$ that flows through an external circuit between the fast charge lead 68 and the battery lead 34, 50 of the adjacent electrode 32, 46 and applied over a second time interval $T_2$.

Figure 5:
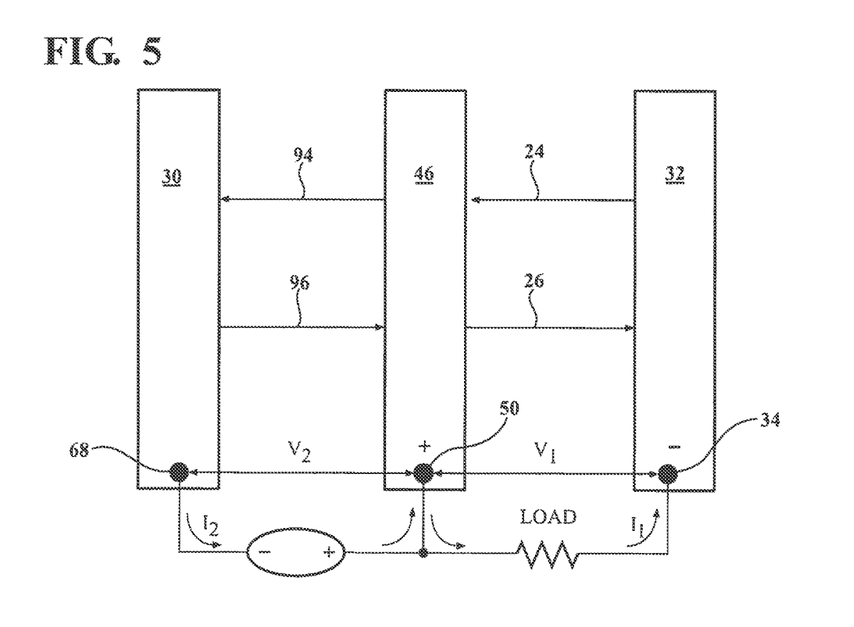
FIG. 5 is a schematic of a fast charge system with a fast charge composite disposed adjacent a cathode layer and showing the movement of ions and conventional (positive) current flow while charging the secondary battery using the fast charge composite and while discharging the secondary battery.

The second electrical power $P_{FC}$ causes the third ions 94 and the fourth ions 96 to migrate through the separator 62 between the adjacent electrode 32, 46 and the fast charge layer 30 to change the electrochemical potential of the adjacent electrode 32, 46 and to cause the secondary battery 22 to store the predetermined amount of electrical energy in a shorter second time interval $T_2$ than the first time interval $T_1$ when subjected at or below the maximum charging power $P_{MAX}$ by traditional charging means. In other words, it is possible to charge the secondary battery 22 using the fast charge composite 60 in less time than is possible through traditional charging by applying a first voltage $V_1$ and a first current $I_1$ between the battery leads 34, 50. FIG. 5 is a schematic representation of the application of the second electrical power $P_{FC}$ to the fast charge layer 30 by application of the second voltage $V_2$ and the second current $I_2$. FIG. 5 also shows the secondary battery 22 transferring power into a resistive load connected between the battery leads 34, 50 at the same time as the secondary battery 22 is being charged using the fast charge composite 60.

The adjacent electrode 32, 46 must be permeable to the third ions 94 and the fourth ions 96. More specifically, a sufficient number of the third ions 94 and the fourth ions 96 must be able to penetrate within the adjacent electrode 32, 46 in response to the application of the second voltage $V_2$, to cause a sufficient change in the electrochemical potential of the adjacent electrode 32, 46 that enables the secondary battery 22 to store the predetermined amount of electrical energy. A cathode layer 46 that contains a host lattice 54 having a conjugated system with delocalized $\pi$ electrons may be used as the adjacent electrode 32, 46. Alternatively, an anode layer 32 may be used as the adjacent electrode 32, 46. Such an anode layer 32 may be formed, for example, as an open-cell foam or a solid of particles or granules bound together.

Because of the electrical isolation between the remote electrode 32, 46 and the fast charge composite 60, the second voltage $V_2$ can be different than the first voltage $V_1$. This means that it is possible to apply a second voltage $V_2$ that is in excess of the maximum voltage $V_{MAX}$, which would cause damage to the first electrolyte 44 and/or the membrane 38 and/or either of the electrodes 32, 46 if it were to be applied between the electrodes 32, 46.

In one embodiment, the adjacent electrode 32, 46 is the cathode layer 46, and the remote electrode 32, 46 is the anode layer 32, and each of which is electrically isolated from the fast charge layer 30.

In a second, alternative embodiment, the adjacent electrode 32, 46 is the anode layer 32 and the remote electrode 32, 46 is the cathode layer 46, and each of which is electrically isolated from the fast charge layer 30.

The present invention also provides a method for constructing a fast charge composite 60 combined with a secondary battery 22.

The method includes the steps of: stacking a separator 62 of electrically insulating material upon and parallel to either the anode layer 32 or the cathode layer 46 rendering it the adjacent electrode 32, 46, stacking a fast charge layer 30 of thermally expanded graphite foil 66 upon and parallel to the separator 62 so the separator 62 is disposed between the and the fast charge layer 30, and attaching a fast charge lead 68 in electrical contact with the fast charge layer 30 with a conductive adhesive 52 of graphite paint.

The method includes steps for producing a second electrolyte 64, including: dissolving $AlCl_3$ powder in ethanol to saturation to create a background solution, combining 40 wt % of the background solution with 60 wt % of glycerol to make a binary solvent, grating 1 cm³ of 99.4 to 99.9 wt % of Aluminum of 99.95% purity and 0.1 to 0.6 wt % of indium to make filings with an equivalent surface area of 20 to 30 cm², immersing the filings in 150 to 200 ml of the binary solvent until the filings have dissolved to produce a second electrolyte 64 that includes third ions 94 that contain Aluminum and have a positive charge and fourth ions 96 that contain Aluminum and have a negative charge.

The method concludes with the step of wetting the separator 62 with the second electrolyte 64.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be

| Element Symbol | Element Name |
|---|---|
| 20 | fast charge system |
| 22 | secondary battery |
| 24 | first ions |
| 26 | second ions |
| 28 | electroactive layer |
| 30 | fast charge layer |
| 32 | anode layer |
| 34 | negative battery lead |
| 36 | cement |
| 38 | membrane |
| 44 | first electrolyte |
| 46 | cathode layer |
| 48 | carrier sheet |
| 50 | positive battery lead |
| 52 | adhesive |
| 54 | host lattice |
| 58 | dopant |
| 60 | fast charge composite |
| 62 | separator |
| 64 | second electrolyte |
| 66 | foil |
| 68 | fast charge lead |
| 94 | third ions |
| 96 | fourth ions |
| $I_1$ | first current |
| $I_2$ | second current |
| $I_{MAX}$ | maximum current |
| $P_{FC}$ | second electrical power |
| $P_{MAX}$ | maximum charging power |
| $T_1$ | first time interval |
| $T_2$ | second time interval |
| $V_1$ | first voltage |
| $V_2$ | second voltage |
| $V_{MAX}$ | maximum voltage |

What is claimed is:

1. A fast charge system (20) including a secondary battery (22) comprising;
   a pair of electrodes (32, 46) including an anode layer (32) and a cathode layer (46) extending in parallel and spaced relationship to one another,
   a membrane (38) sandwiched between said anode layer (32) and said cathode layer (46),
   a first electrolyte (44) including first ions (24) and impregnating said membrane (38) to carry an excess ion migration through said membrane (38) in response to the application of a maximum charging power ($P_{MAX}$) as a function of a first voltage ($V_1$) between said anode layer (32) and said cathode layer (46) times a first current ($I_1$) therebetween and applied over a first time interval ($T_1$),
   a fast charge composite (60) with a second electrolyte (64) including third ions (94) having a positive charge and including fourth ions (96) having a negative charge and disposed adjacent to and contacting one of said electrodes (32, 46) rendering it an adjacent electrode (32, 46) and the remaining one of said electrodes (32, 46) a remote electrode (32, 46) electrically isolated from said fast charge composite (60) and responsive to the application of a second electrical power ($P_{FC}$) greater than said maximum charging power ($P_{MAX}$) and a function of a second voltage ($V_2$) between said fast charge composite (60) and said adjacent electrode (32, 46) times a second current ($I_2$) therebetween and applied over a second time interval ($T_2$) to cause said third ions (94) and said fourth ions (96) to migrate between said adjacent electrode (32, 46) and said fast charge composite (60) to change the electrochemical potential of said adjacent electrode (32, 46) to enable said secondary battery (22) to store said predetermined amount of electrical energy in less said second time interval ($T_2$) than said first time interval ($T_1$) when subjected at and below said maximum charging power ($P_{MAX}$); and
   said first electrolyte (44) consisting essentially of glycerol and at least one of said first ions (24) or said third ions (94) or said fourth ions (96) containing Aluminum.

2. A fast charge system (20) as set forth in claim 1 wherein said first ions (24) include $[Al(ClO_4)_2 \cdot \{C_3H_5(OH)_3\}_2]^+$.

3. A fast charge system (20) as set forth in claim 1 wherein said first electrolyte (44) includes second ions (26) including $[Al(ClO_4)_4]^-$.

4. A fast charge system (20) including a secondary battery (22) having a capacity to store a predetermined amount of electrical energy, said fast charge system (20) comprising;
   a pair of electrodes (32, 46) including an anode layer (32) and a cathode layer (46) extending in parallel and spaced relationship to one another,
   a membrane (38) sandwiched between said anode layer (32) and said cathode layer (46),
   a first electrolyte (44) including first ions (24) and impregnating said membrane (38) to carry an excess ion migration through said membrane (38) in response to the application of a maximum charging power ($P_{MAX}$) as a function of a first voltage ($V_1$) between said anode layer (32) and said cathode layer (46) times a first current ($I_1$) therebetween and applied over a first time interval ($T_1$),
   a fast charge composite (60) including a separator (62) impregnated with a second electrolyte (64) including third ions (94) having a positive charge and including fourth ions (96) having a negative charge and disposed adjacent to and contacting one of said electrodes (32, 46) rendering it an adjacent electrode (32, 46) and the remaining one of said electrodes (32, 46) being rendered a remote electrode (32, 46) electrically isolated from said fast charge composite (60),
   said adjacent electrode (32, 46) being permeable to said third ions (94) and said fourth ions (96) for allowing said third ions (94) and said fourth ions (96) to penetrate within said adjacent electrode (32, 46),
   said fast charge composite (60) including a fast charge layer (30) disposed adjacent and parallel to said separator (62) with said separator (62) sandwiched between said adjacent electrode (32, 46) and said fast charge layer (30) to electrically insulate said fast charge layer (30) from said adjacent electrode (32, 46) and for exchanging said third ions (94) and said fourth ions (96) through said separator (62) with said adjacent electrode (32, 46),
   said fast charge composite (60) including a fast charge lead (68) of electrically conductive material electrically connected to said fast charge layer (30) for the application of a second electrical power ($P_{FC}$) greater than said maximum charging power ($P_{MAX}$) and a function of a second voltage ($V_2$) between said fast charge lead (68) and said battery lead (34, 50) of said adjacent electrode (32, 46) times a second current ($I_2$) therebetween and applied over a second time interval ($T_2$) to cause said third ions (94) and said fourth ions (96) to migrate between said adjacent electrode (32, 46) and said fast charge layer (30) to change the electrochemical potential of said adjacent electrode (32, 46) to enable said secondary battery (22) to store said predetermined amount of electrical energy in less said second time interval ($T_2$) than said first time interval ($T_1$) when subjected at and below said maximum charging power ($P_{MAX}$); and said first electrolyte (44) consisting essentially of glycerol and at least one of said first ions (24) or said third ions (94) or said fourth ions (96) containing Aluminum.

5. A fast charge system (20) as set forth in claim 4 wherein said adjacent electrode (32, 46) is said cathode layer (46).

6. A fast charge system (20) as set forth in claim 4 wherein said adjacent electrode (32, 46) is said anode layer (32).

7. A fast charge system (20) as set forth in claim 4 wherein said fast charge layer (30) comprises thermally expanded graphite.

8. A fast charge system (20) as set forth in claim 4 wherein said first ions (24) include $[Al(ClO_4)_2 \cdot \{C_3H_5(OH)_3\}_2]^+$.

9. A fast charge system (20) as set forth in claim 4 wherein said first electrolyte (44) includes second ions (26) including $[Al(ClO_4)_4]^-$.

10. A fast charge system (20) including a secondary battery (22) having a capacity to store a predetermined amount of electrical energy, said fast charge system (20) comprising;

a pair of electrodes (32, 46) including an anode layer (32) and a cathode layer (46) extending in parallel and spaced relationship to one another, said anode layer (32) consisting of 99.4 wt % to 99.9 wt % of solid Aluminum of 99.95% purity and 0.1 wt % to 0.6 wt % of Indium and having first rectangular borders defining a first length of 1.2 cm and a first width of 1.7 cm and a first thickness of 0.1 mm, a negative battery lead (34) of an electrically conductive material in electrical contact with said anode layer (32) for conducting electrical current with external circuitry, a cement (36) including particles containing metal and disposed between said anode layer (32) and said negative battery lead (34) for attaching said anode layer (32) to said negative battery lead (34) and for conducting electrical current therebetween, said cathode layer (46) having second rectangular borders defining a second length of 1.4 cm and a second width of 1.9 cm and a second thickness of 0.1 mm, said cathode layer (46) including a carrier sheet (48) of cellulose and an electroactive layer (28) integrated with and upon said carrier sheet (48) facing said anode layer (32), a positive battery lead (50) containing thermally expanded graphite in electrical contact with said electroactive layer (28) of said cathode layer (46) for conducting electrical current with external circuitry, an adhesive (52) containing graphite disposed between said electroactive layer (28) and said positive battery lead (50) for attaching said electroactive layer (28) to said positive battery lead (50) and for conducting electrical current therebetween, a membrane (38) of cellulose having a third thickness of 0.08 mm and defining a plurality of pores and sandwiched between said anode layer (32) and said cathode layer (46) for providing electrical insulation and to define a first voltage ($V_1$) therebetween, a first electrolyte (44) including first ions (24) containing Aluminum and having a positive charge and including second ions (26) containing Aluminum and having a negative charge and impregnating said pores of said membrane (38) and carrying an excess ion migration through said membrane (38) in response to the application of a first current ($I_1$) between said positive battery lead (50) and said negative battery lead (34) greater than a predetermined maximum current ($I_{MAX}$) and to define a maximum charging power ($P_{MAX}$) as said first voltage ($V_1$) times said first current ($I_1$) with one of said first voltage ($V_1$) in excess of a predetermined maximum voltage ($V_{MAX}$) and said first current ($I_1$) in excess of said maximum current ($I_{MAX}$) and applied over a first time interval ($T_1$) to damage said secondary battery (22), said first electrolyte (44) consisting essentially of glycerol and said first ions (24) containing Aluminum including $[Al(ClO_4)_2 \cdot \{C_3H_5(OH)_3\}_2]^+$ and said second ions (26) containing Aluminum including $[Al(ClO_4)_4]^-$ for migrating between and reacting with said anode layer (32) and said cathode layer (46) to charge and discharge said secondary battery (22), said electroactive layer (28) of said cathode layer (46) containing a host lattice (54) having a conjugated system with delocalized $\pi$ electrons and defining voids and a dopant (58) containing Aluminum Alcoholate and Aluminum Glycerate bonded with said conjugated system of said host lattice (54) and intercalated in said voids to alter the electrochemical properties of said electroactive layer (28) of said cathode layer (46) to increase the rate of the reactions with said first ions (24) and said second ions (26) for charging and discharging said secondary battery (22), and a fast charge composite (60) having third rectangular borders between said first and said second rectangular borders and including a separator (62) of cellulose for providing electrical insulation and impregnated with a second electrolyte (64) including third ions (94) containing Aluminum and having a positive charge and including fourth ions (96) containing Aluminum and having a negative charge and disposed parallel to and contacting one of said electrodes (32, 46) rendering it an adjacent electrode (32, 46) and the remaining one of said electrodes (32, 46) a remote electrode (32, 46) electrically isolated from said fast charge composite (60), said adjacent electrode (32, 46) being permeable to said third ions (94) and said fourth ions (96) for absorbing and reacting with said third ions (94) and said fourth ions (96) within said adjacent electrode (32, 46), said fast charge composite (60) including a fast charge layer (30) comprising foil (66) of thermally expanded graphite disposed adjacent and parallel to said separator (62) with said separator (62) sandwiched between said adjacent electrode (32, 46) and said fast charge layer (30) to electrically insulate said fast charge layer (30) from said adjacent electrode (32, 46), said fast charge composite (60) including a fast charge lead (68) of electrically conductive material electrically connected to said fast charge layer (30) for the application of a second electrical power ($P_{FC}$) greater than said maximum charging power ($P_{MAX}$) and a function of a second voltage ($V_2$) between said fast charge lead (68) and said battery lead (34, 50) of said adjacent electrode (32, 46) times a second current ($I_2$) therebetween and applied over a second time interval ($T_2$) to cause said third ions (94) and said fourth ions (96) to migrate through said separator (62) between said adjacent electrode (32, 46) and said fast charge layer (30) to change the electrochemical potential of said adjacent electrode (32, 46) and to enable said secondary battery (22) to store said predetermined amount of electrical energy in less said second time interval ($T_2$) than said first time interval ($T_1$) when subjected at and below said maximum charging power ($P_{MAX}$).

11. A fast charge system (20) as set forth in claim 10 wherein said adjacent electrode (32, 46) is said cathode layer (46) and said anode layer (32) is electrically isolated from said fast charge layer (30).

12. A fast charge system (20) as set forth in claim 10 wherein said adjacent electrode (32, 46) is said anode layer (32) and said cathode layer (46) is electrically isolated from said fast charge layer (30).

13. A fast charge system (20) as set forth in claim 10 wherein said particles containing metal of said cement (36) include Silver.

14. A fast charge system (20) as set forth in claim 10 wherein said particles containing metal of said cement (36) include Aluminum.

\* \* \* \* \*